United States Patent Office 2,694,080
Patented Nov. 9, 1954

2,694,080

11-HYDROXY - 13 - METHYL - 17 - (β-HYDROXY-ETHYLIDENE) - 1,2,3,6,7,8,9,10,11,12,13,14,16,17-TETRADECAHYDRO - 15H - CYCLOPENTA[a]-PHENANTHREN - 3 - ONE

Frank B. Colton, Chicago, and Jack W. Ralls, Morton Grove, Ill., assignors to G. D. Searle & Co., Chicago, Ill., a corporation of Illinois No Drawing. Application May 25, 1953,
Serial No. 357,375

1 Claim. (Cl. 260—397.45)

The present invention relates to a new group of polycyclic compounds and more particularly to the 11-hydroxy - 13 - methyl - 17 - (β - hydroxyethylidene) - 1,2,3,-6,7,8,9,10,11,12,13,14,16,17-tetradecahydro - 15H - cyclopenta[a]phenanthren-3-ones substituted in the 10-position by a hydrogen or a methyl radical. The compounds which constitute this invention can be represented by the structural formula

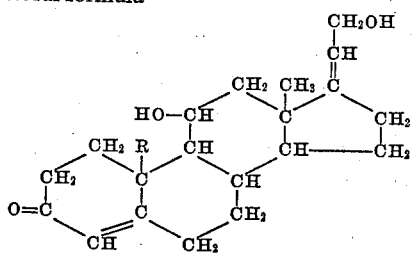

wherein R is a member of the group consisting of hydrogen and methyl radicals.

These compounds are valuable in providing medicinal agents useful in the treatment of rheumatoid diseases and allergic arteritis. They are valuable as intermediates in organic synthesis.

Acetylation of the claimed compounds in which the 11-hydroxy group is in β-position and R is a methyl group yields 11-hydroxy-10,13-dimethyl - 17 - (β-acetoxyethylidene) - 1,2,3,6,7,8,9,10,11,12,13,14,16,17-tetradecahydro - 15H - cyclopenta[a]phenanthren - 3 - one. Treatment of a tertiary butanol solution of this compound with hydrogen peroxide and then with osmium tetroxide yields the 17-hydroxy-17-glycolyl derivative of the type

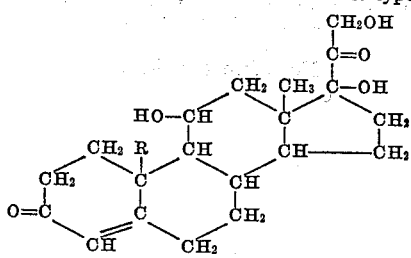

wherein R is methyl. This compound is identical with the hormone hydrocortisone. The compound of the last formula wherein R is hydrogen is prepared in the same manner; it is of particular value since it lacks some of the undesirable side effects of the naturally occurring adrenal hormones.

A convenient starting material for the preparation of 11 - hydroxy - 13 - methyl - 17 - (β - hydroxyethylidene)-1,2,3,6,7,8,9,10,11,12,13,14,16,17 - tetradecahydro - 15H-cyclopenta[a]phenanthren-3-one is the 3-methoxy-13-methyl - 1,4,6,7,8,9,11,12,13,14,16,17 - dodecahydro-15H-cyclopenta[a]phenanthren-17-one described in the copending application by F. B. Colton, Serial Number 286,611, filed May 7, 1952, of which the present application is a continuation-in-part. By the method described therein the 17-keto group is ethynylated and the 3-methoxy - 13 - methyl - 17 - ethynyl - 1,4,6,7,8,9,11,12,13,14,-16,17 - dodecahydro - 15H - cyclopenta[a]phenanthren-17-ol is treated with hydrochloric acid and methanol to form 13 - methyl - 17 - ethynyl - 1,4,6,7,8,9,11,12,13,14,- 16,17 - dodecahydro - 15H - cyclopenta[a]phenanthren-3-one. By catalytic hydrogenation the ethynyl group is reduced to a vinyl group. Treatment with phosphorus tribromide yields the 13-methyl-17-(β-bromoethylidene)-1,2,3,6,7,8,9,10,11,12,13,14,16,17 - tetradecahydro - 15H-cyclopenta[a]phenanthren-3-one. The (β-bromoethylidene) group is converted to a (β-acetoxyethylidene) group by treatment with potassium acetate. Alkaline hydrolysis yields 13 - methyl-17-(β-hydroxyethylidene)-1,2,3,6,7,8,9,10,11,12,13,14,16,17 - tetradecahydro - 15H-cyclopenta[a]phenanthren-3-one. This compound, its 21-acetate, and its 10-methyl derivatives can be hydroxylated in the 11-position by biochemical oxidation. While oxidation with fungi and bacteria leads to the 11α-hydroxy derivatives, perfusion through surviving mammalian adrenal glands yields the 11β-hydroxy derivatives. The 11-hydroxy derivatives are conveniently isolated from the biochemical reaction mixture by extraction with a lower alkyl acetate and chromatography on a silica gel column, mixtures of benzene and increasing amounts of ethyl acetate being used as eluents.

The following examples illustrate the procedure used in the practice of our invention and the compounds prepared thereby. However, the invention is not to be construed as limited by the details set forth in spirit or in scope. It will be apparent to those skilled in the art that many modifications in materials and methods may be practiced without departing from the invention. In each of these examples temperatures are given in degrees centigrade (° C.) and relative amounts of materials in parts by weight.

Example 1

1 part of 13-methyl-17-hydroxy-17-(β-acetoxyethylidene)-1,2,3,6,7,8,9,10,11,12,13,14,16,17 - tetradecahydro-15H - cyclopenta[a]phenanthren - 3 - one is stirred with 5000 parts of citrated beef blood and 5000 parts of 0.85% aqueous sodium chloride solution. This solution is perfused three times through a surviving beef adrenal, which is cannulated through the vein and has a finely lacerated surface. The perfusate is then extracted with isopropyl acetate. The extract is dried by azeotropic distillation and then concentrated to a residue of about 20 parts. After dilution with 380 parts of benzene the solution is poured into a chromatography column consisting of 90 parts of silica gel. Elution with 1200 parts of a 10% solution of ethyl acetate in benzene and 600 parts of a 20% solution of ethyl acetate in benzene yields mainly cholesterol. The column is then eluted with 600 parts of a 33% solution of ethyl acetate in benzene; concentration yields the 13-methyl-17-(β-hydroxyethylidene)-1,2,3,6,7,8,9,10,11,12,13,14,16,17 - tetradecahydro - 15H-cyclopenta[a]phenanthren - 3 - one, which recrystallized from petroleum ether, melts at about 152–154° C.

The column is washed with 1200 parts of a 50% and with 300 parts of a 66% solution of ethyl acetate in benzene. Subsequent elution with 300 parts of a 33% solution and 600 parts of a 20% solution of benzene in ethyl acetate yields 11 - hydroxy - 13 - methyl - 17-(β-hydroxyethylidene) - 1,2,3,6,7,8,9,10,11,12,13,14,16,-17 - tetradecahydro - 15H - cyclopenta[a]phenanthren-3-one, which crystallized twice from ethyl acetate, melts at about 168–170° C. This compound gives a negative blue tetrazolium test and a 1% chloroform solution shows a molecular rotation of $[\alpha]_D^{20} = +89°$. The ultraviolet absorption spectrum has a maximum at 242 millimicrons with a molecular extinction coefficient of 17,300. This compound has the structural formula

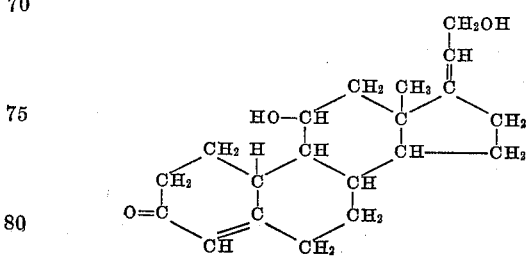

Example 2

A mixture of 90 parts of 11 - hydroxy - 13 - methyl - 17 - (β - hydroxyethylidene) - 1,2,3,6,7,8,9,10,11,12,13,14,16,17 - tetradecahydro - 15H - cyclopenta[a]phenanthren - 3 - one, 139 parts of sodium acetate, 700 parts of acetic anhydride and 1000 parts of glacial acetic acid is kept at room temperature for 4 hours and then treated by the gradual addition of chipped ice to induce crystallization. After standing for 1 hour the reaction mixture is filtered and the material collected on the filter is dried. The 11 - hydroxy - 13 - methyl - 17 - (β - acetoxyethylidene) - 1,2,3,6,7,8,9,10,11,12,13,14,16,17 - tetradecahydro - 15H - cyclopenta[a]phenanthren - 3 - one thus obtained melts at about 123–124° C.

Example 3

To a mixture of 119 parts of 11β - hydroxy - 13 - methyl - 17 - (β - acetoxyethylidene) - 1,2,3,6,7,8,9,10,11,12,13,14,16,17 - tetradecahydro - 15H - cyclopenta[a]phenanthren - 3 - one in 2000 parts of butanol and 46 parts of hydrogen peroxide in 3000 parts of butanol, 11 parts of osmium tetroxide in 1000 parts of butanol are added in the course of 12 minutes. An additional quantity of 11 parts of osmium tetroxide in 1000 parts of butanol is added in the course of the following 2 hours at room temperature to the reaction mixture which turns greenish-brown upon standing at room temperature for 24 hours. Then 20,000 parts of water are added and the mixture is concentrated under vacuum to one-fifth of its original volume. The residue is extracted with ethyl acetate and is dried over anhydrous sodium sulfate and concentrated under vacuum. The resulting residue is taken up in aqueous methanol and treated with 50 parts of aqueous sodium sulfite. After refluxing for 30 minutes the reaction mixture is concentrated, diluted with water and extracted with ethyl acetate. The extract is dried over sodium sulfate, filtered and evaporated to yield 11β,17 - dihydroxy - 17 - (β - hydroxyacetyl) - 1,2,3,6,7,8,9,10,11,12,13,14,16,17 - tetradecahydro - 15H - cyclopenta[a] - phenanthren - 3 - one which has the structural formula

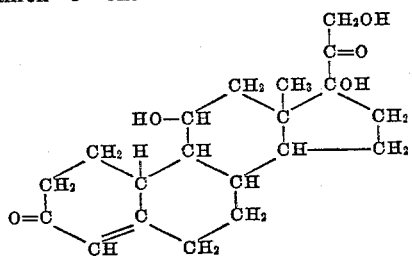

Example 4

A solution of 0.8 part of 10,13 - dimethyl - 17 - (β - hydroxyethylidene) - 1,2,3,6,7,8,9,10,11,12,13,14,16,17 - tetradecahydro - 15H - cyclopenta[a]phenanthren - 3 - one in 5000 parts of citrated beef blood and 5000 parts of physiological saline solution is perfused through surviving beef adrenals. In the manner of Example 1, the perfusate is extracted with butyl acetate, the extract is concentrated, mixed with benzene and applied to a chromatography column containing 80 parts of silica gel. Washing with 1200 parts of a 5% and 600 parts of a 10% solution of ethyl acetate in benzene yields mainly glandular material and cholesterol. The elution with 600 parts of a 10% and 600 parts of a 20% solution of ethyl acetate in benzene gives an extract which, on concentration, yields a yellow gum. Subsequent elution with 600 parts of a 33% solution elutes unconverted starting material. Elution with 300 parts of a 50% solution of ethyl acetate in benzene yields a yellow glass. Another 300 part portion of the same concentration yields, on evaporation, a white solid product which, on recrystallization from ethyl acetate, melts at about 268–270° C. The column is next eluted with 600 parts of a 50% solution of ethyl acetate in benzene. Concentration of this eluate and crystallization from ethyl acetate yields 11β - hydroxy - 10,13 - dimethyl - 17 - (β - hydroxyethylidene) - 1,2,3,6,7,8,9,10,11,12,13,14,16,17 - tetradecahydro - 15H - cyclopenta[a]phenanthren - 3 - one which melts at about 177–178° C. The ultraviolet absorption spectrum shows a maximum at about 242 millimicrons with a molecular extinction coefficient of 17,900. The molecular rotation, as determined in an 0.5% chloroform solution, is $[\alpha]_D^{20} = +151°$. This compound has the structural formula

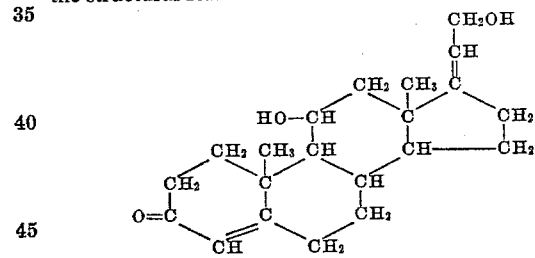

On further elution of the column with a 66% solution of ethyl acetate in benzene, a mixture of products is obtained which, on concentration, melts at about 179–188° C.

We claim:

11β - hydroxy - 13 - methyl - 17 - (β - hydroxyethylidene) - 1,2,3,6,7,8,9,10,11,12,13,14,16,17 - tetradecahydro-15H-cyclopenta[a]phenanthren-3-one.

No references cited.